United States Patent [19]
Casey

[11] 3,806,158
[45] Apr. 23, 1974

[54] HINGE JOINT
[75] Inventor: Robert Casey, Washington, Ill.
[73] Assignee: Caterpillar Tractor Co., Peoria, Ill.
[22] Filed: Aug. 21, 1972
[21] Appl. No.: 282,140

[52] U.S. Cl.................... 280/400, 180/51, 287/88, 287/100, 308/72
[51] Int. Cl............................................ B62d 53/02
[58] Field of Search......... 280/400; 308/72; 287/88, 287/89, 100; 180/51

[56] References Cited
UNITED STATES PATENTS
| | | | |
|---|---|---|---|
| 2,308,613 | 1/1943 | Le Tourneau | 287/88 R |
| 3,347,577 | 10/1967 | Carlson et al. | 280/400 UX |
| 2,711,352 | 6/1955 | Hasko et al. | 308/72 R |

Primary Examiner—Leo Friaglia
Assistant Examiner—Randall A. Schrecengost
Attorney, Agent, or Firm—Fryer, Tjensvold, Phillips & Lempio

[57] ABSTRACT

A hinge joint for connecting the front and rear frames of an articulated vehicle including a single arm extending from one frame and having a cylindrical bore therein, a pair of other arms extending from the other frame and disposed on either side of the single arm, a pin member having a spherical bearing portion and having a pair of integral trunnions extending from the bearing portion. Cap members are provided for clamping the trunnions to the pair of other arms so as to locate the spherical bearing portion vertically between the pair of other arms, and a spherical bushing in the cylindrical bore is provided for receiving the spherical bearing portion therein.

13 Claims, 6 Drawing Figures

HINGE JOINT

BACKGROUND OF THE INVENTION

The articulation joints of various articulated earthmoving vehicles, such as articulated wheel loaders, must be capable of withstanding extremely high loading imposed by the front and rear frames of such vehicle. Simply adding more material to these joints for strength is not desirable from an economic standpoint and does not necessarily assure the dependability of the joint. Furthermore, due to the central location of such joints, space is at a premium and bulky joints are precluded.

In recent years, there seems to have been a tendency to increase the complexity of such hinge joint in proportion to the increased work expected of the vehicles embodying them. For example, U.S. Pat. No. 2,308,613 to R.G. LeTourneau, the Carlson et al U.S. Pat. No. 3,347,577, and the Kampert et al. U.S. Pat. No. 3,411,809 are illustrative of such complexity. Separate pin and spherical bearings, the use of multiple retainers, use of spacers and shims, and complex methods of sealing spherical bearings with respect to the mating sockets have greatly increased the cost as well as the difficulty of assembling and disassembling of such joints.

Further, in prior art vehicles using plural joint systems, the upper and lower hinge joints are often of different construction and are designed in such a way that certain loads are absorbed individually instead of by both joints. Such joints must, therefore, be made individually capable of withstanding the peak loading generated by external forces, i.e., loading and traveling; and by internal forces, i.e., power train and vehicle weight. This, of course, is inefficient and costly so that it is highly desirable to cause such plural joints to work together by means of suitable adjustment during the assembly process such that loading is shared and peak loading design capabilities are not required for the individual joint units.

Another vexing problem attendant to conventional joint systems for articulated vehicles is the requirement for in-line boring of the large and bulky welded frame assemblies during manufacture. This process, necessary for critical tolerance fits, requires spacious handling facilities and very large boring equipment which contribute to overall costs.

SUMMARY AND OBJECTS OF THE INVENTION

The present invention provides an economically fabricatable joint system which provides suitable load bearing distribution, is not complex, and does not require costly in-line boring. The instant system overcomes all of the above enumerated problems by providing a hinge joint for articulatingly connecting a pair of vehicle frames, which is not only simple and economical in construction but which is also fully functional and capable of withstanding severe operating loads.

An object of the present invention is to provide a hinge joint for articulatingly connecting vehicle frame members which has few parts and which does not include a complex bearing adjustment arrangement.

Another object of the invention is to provide a hinge joint having components which when installed on the frames of an articulated vehicle do not have to be line bored to insure proper alignment of mating surfaces, and which are of such construction that assembly and disassembly of the frames are relatively simple tasks.

Other objects and advantages of the present invention will become apparent upon reference to the accompanying drawings and following description.

DESCRIPTION OF THE PREFERRED EMBODIMENT

Figure 1:
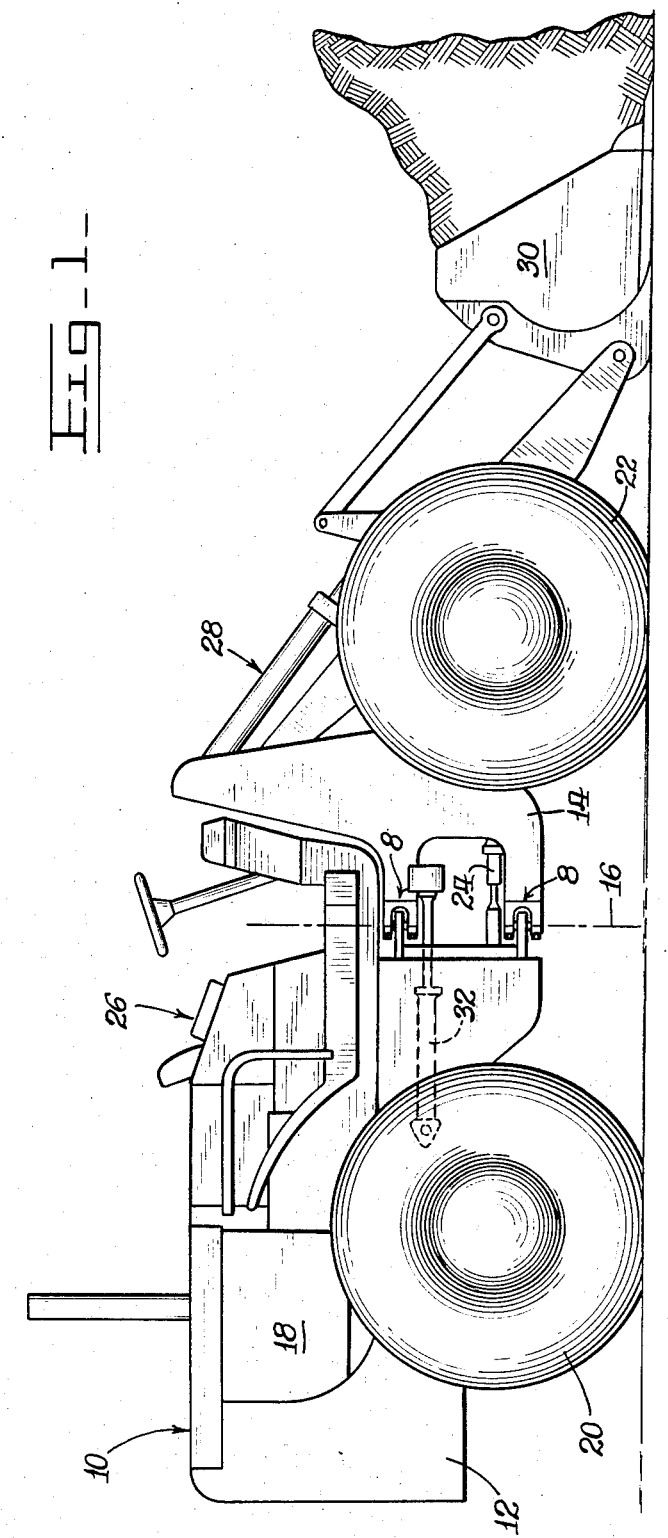
FIG. 1 is a side elevation of an articulated wheel loader vehicle incorporating a pair of hinge joints of the subject invention.

With reference to FIG. 1 of the drawings, a pair of hinge joints 8 are shown incorporated in an articulated vehicle such as an articulated wheel loader 10. The loader vehicle has a rear frame 12 and a front frame 14 pivotally connected to each other through the pair of hinge joints along a vertical axis 16 for steering purposes. The rear frame includes a power plant 18 for driving a pair of rear wheels 20 and a pair of front wheels 22 via a drive line 24. The rear frame further includes an operator station shown generally at 26, and the front frame includes an implement system 28 for manipulating an earthmoving bucket 30 disposed upon the front of the machine. A pair of extendible hydraulic jacks, shown generally by broken lines 32, are disposed between the rear frame and front frame to effect steering of the vehicle by displacing one frame thereof relative to the other about a vertical axis 16 in a conventional manner.

Figure 2:
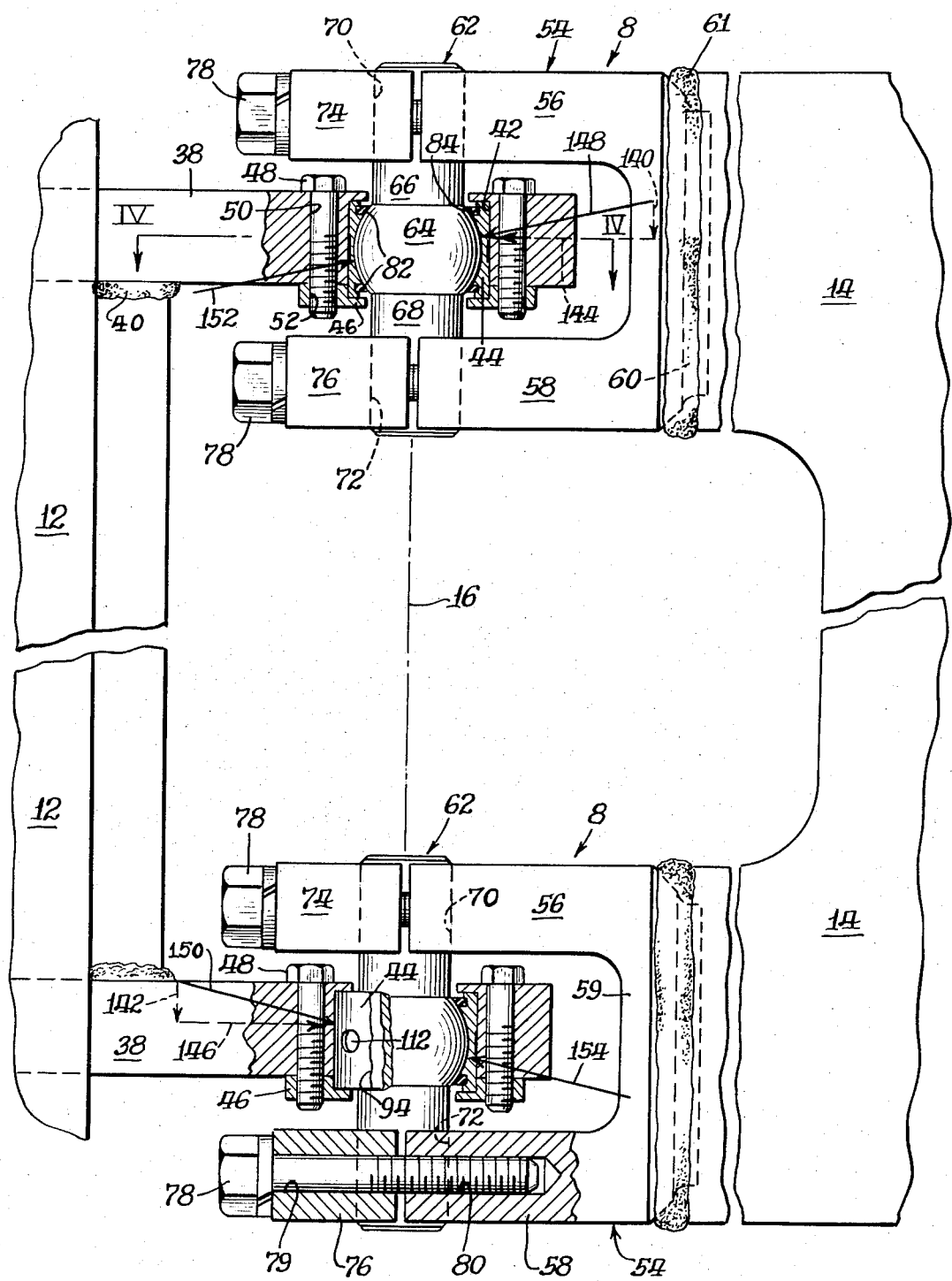
FIG. 2 is an enlarged fragmentary side elevation of the hinge joints shown in FIG. 1 with certain parts in section to show details of construction.

The upper and lower hinge joints 8 are shown in detail in FIG. 2 of the drawings. Since the upper and lower hinge joints are similar in construction, identical reference numbers will be used hereinafter to designate corresponding parts. The rear or leftward portion of the upper hinge joint includes a single arm or plate member 38 which is integrally secured to the rear frame 12 as by means of a plurality of welds 40. The plate member 38 includes a forwardly disposed, stepped cylindrical bore 42 in which bore is contained a spherical bushing or socket member 44. The spherical bushing 44 is held in place by means of a stepped retainer 46. The retainer is held by a plurality of bolts 48 insertable through a complementing plurality of smooth bores 50 in the plate member and threaded bores 52 in the retainer.

Rearwardly extending from the front frame 14 is a yoke or hitch portion 54 which includes a pair of arms 56 and 58 integrally fixed at their proximal ends to a common body 59 having a contoured front face portion 60. This front face portion is contoured so that the yoke may be adaptably received by and be secured to the frame by means of a plurality of welds 61. The rearwardly extending arms 56, 58 are functionally disposed at either side of the plate 38 for receiving a pin member shown generally at 62. The pin member includes a spherical bearing portion 64 and a pair of oppositely extending trunnions 66 and 68 which are grippingly clamped within a pair of cylindrical openings 70 and 72 defined by a pair of caps 74 and 76 and machined portions of the arms 56, 58. A plurality of bolts 78 are inserted through a corresponding plurality of bores 79 in the caps, and are threadably inserted into threaded openings 80 in the arms.

The spherical bearing surface 64 is seated within the spherical socket member or bushing 44 and is protected from dirt and other debris by a pair of elastomeric seals 82. These seals are disposed within annular grooves or recesses 84 formed within the bushing, as shown. The elastomeric seals are in intimate contact with the surface of the spherical bearing so that some pin misalignment can be tolerated, but so that lubricant can still be retained within the associated bearing surfaces for extended service life of the unit.

The spherical bushing 44 has a fractured configuration so that it may intimately contact the surface of the spherical bearing surface. Bushing 44 may be of single fractured construction as shown by the single vertical fracture line 94 in FIG. 2. Alternatively, the bushing may be a fractured bearing having two vertical fractures on opposite sides thereof. Fractured spherical bushing members are desirable because they allow the maintenance of close dimensional control within the cylindrical bore 42 and corresponding intimate relationship with the spherical bearing portions of the pins.

Figure 5:
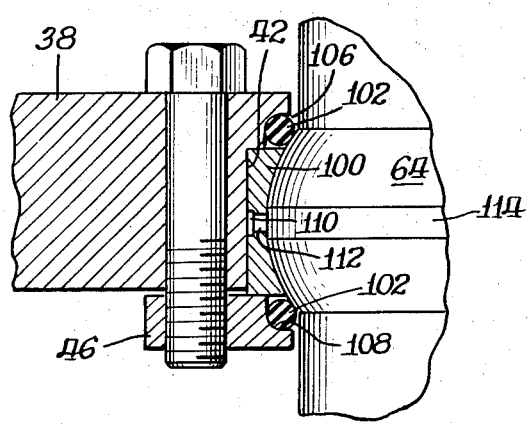
FIG. 5 is an enlarged fragmentary longitudinal vertical sectional view of an alternate sealing and bushing arrangement for the subject invention.

An alternate seal and bearing arrangement which is included in the present invention is shown in the enlarged fragmentary view of FIG. 5. A spherical bushing 100, disposed within the stepped cylindrical bore 42, is in intimate contact with the spherical bearing portion 64. The related wear surfaces are protected by a pair of elastomeric seals 102 disposed just beyond each extremity of the bushing. The uppermost seal is disposed within a contoured counterbore 106 formed within the plate 38, while the lower seal is disposed within a similar contoured counterbore 108 formed within the retainer 46. The main distinction between this construction and that shown in FIG. 2 is the location of the seals 82 within the annular grooves 84 within the bushing 44. However, like the previously described embodiment, the seals 102 are in constant intimate contact with the spherical bearing portion 64.

To improve lubricant distribution across the associated bearing surfaces, such bushings may be provided with an outer annulus 110 and a plurality of radially disposed ports 112 leading to the internal spherical bearing surfaces. Such lubricant is distributed in a conventional manner via a suitable passage and an externally mounted fitting (not shown) to the bore 42 and to the adjacent annulus 110. The spherical bearing portion 64 may also be provided with a relieved surface 114 to enhance lubricant distribution over the associated wear surfaces of the bearing.

Figure 6:
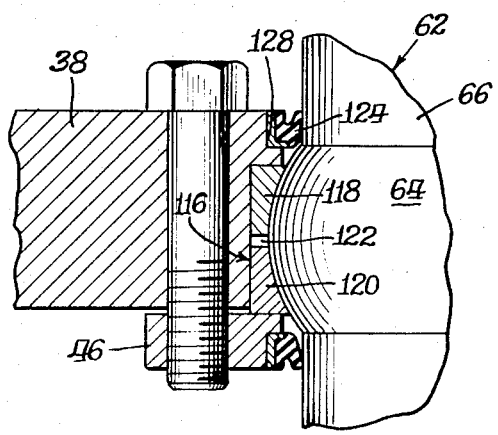
FIG. 6 is an enlarged fragmentary longitudinal vertical sectional view of another alternate sealing arrangement for the hinge joint.

A further modification of the invention is shown in FIG. 6. This construction includes a spherical bushing 116 which has upper and lower bearing shells 118 and 120 with a relatively narrow annular gap 122 defined therebetween. Upper and lower lip-type seals 124 and 126 having metal guards respectively seat within an outwardly facing counterbore 128 in the plate 38 and an outwardly directed counterbore 130 in the retainer 46. These seals are in intimate contact with the external cylindrical portions of trunnions 66.

The modified arrangement of FIG. 6 provides an increase in spherical bushing area and lower potential bearing pressures for a given-size spherical bearing surface when compared to the previously discussed embodiments. This particular version is particularly desirable for use in high loading applications. Placement of the seals 124 and 126 outwardly of the spherical bearing portion 64 allows a maximum amount of contact between the bushing shells and spherical bearing portion of the pin member 62.

It should be noted that other forms of split bearing shells might be utilized without departing from the spirit of the present invention. In this connection, reference is made to U.S. Pat. Nos. 2,711,352 and 3,506,315 relating to other spherical bearing arrangements with seals in intimate contact with the spherical bearing surfaces.

OPERATION AND ASSEMBLY

Figure 3:
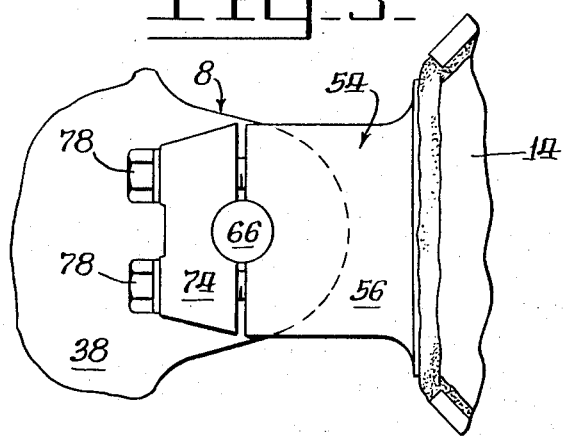
FIG. 3 is a plan view of the upper hinge joint of FIG. 2.
Figure 4:
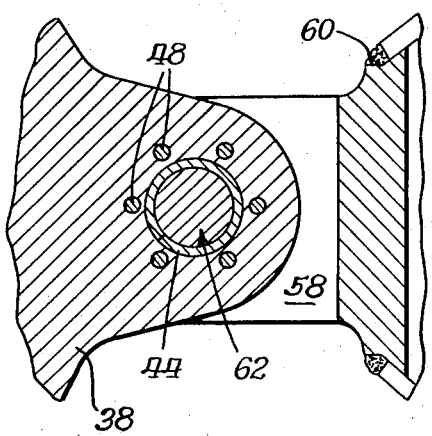
FIG. 4 is a transverse horizontal sectional view of a portion of the hinge joint taken along the line IV—IV in FIG. 2.

Manufacture of the present invention involves conventional stepped boring of the individual rear plates of arms 38 prior to welding same to the rear frame 12. The yokes 54 are milled or conventionally machined on an individual basis to provide cylindrical receptors which constitute halves of the cylindrical openings 70 and 72; and the caps 74 and 76 are machined to provide corresponding halves of the openings. Prior to welding the yokes to the frame 14, the upper and lower yokes are spaceably oriented upon a suitable fixture including a rod (not shown) which has a diameter substantially corresponding to that of the trunnions 66 and 68 and which is positioned coincident with the vertical axis 16. The yokes are retained on the rod by means of the caps 74 and 76 or substitutes therefor, and the forward contoured face portions 60 are then welded to the front frame 14 in a manner most clearly depicted in FIGS. 3 and 4. Only ordinary fixturing is required for the attachment operation, as normal welding precision is good enough for the highly adaptable hinge joint design presented. No machining is necessary once the components are welded or otherwise secured to the frames.

To connect the rear frame 12 to the front frame 14 for vehicle assembly, the upper and lower pin members 62, along with the corresponding spherical bushings 44 are inserted upwardly into the stepped cylindrical bores 42 of the rear plates 38. The bolts 48 are then threadably engaged with the retainer 46 so that the bearing assemblies may be secured within the plates. The upper and lower yokes 54 are then positioned rearwardly so that the semicylindrical openings 70 and 72 thereof contact the upper and lower trunnions 66 and 68 of each joint. Finally, the caps 74 and 76 are urged toward the arms 56 and 58 by threadably inserting the bolts 78 therein. Tightening of the bolts 78 produces a very high clamping force. Preferably, though not mandatorily, the common radius of cylindrical openings 70 and 72 is slightly smaller than the common radius of the trunnions 66 and 68. This difference in radius provides a greater potential holding force for the trunnions as the caps clampingly engage the arms due to the wedging type action between the trunnions and clamps. Because of the self-aligning properties of the spherical bearing portion within the spherical bushing, and the simplicity of the caps as clamping members, it is necessary only to vertically position the trunnions 66 and 68 so than an equal length thereof extends upwardly and downwardly into the arms 56 and 58 for proper positioning of the front and rear frame members before tightening the bolts 78.

Though simple in construction, these joints are capable of absorbing severe loads; and one of the more severe applications is the loading of the earthmoving bucket 30 of the wheel loader shown in FIG. 1 in a tough bank of earth to the extent that the rear frame 12 and the tires 20 are lifted away from the ground as the result of the action of the implement lifting system 28 and subsequent manipulation of the bucket. Under such severe conditions the entire weight of the rear frame 12, the power plant 18, and the operator station 26 must be carried by the hinge joints. In order to illustrate such loading, an upper and a lower vertical loading vector, illustrated respectively by broken lines 140 and 142, have been shown in FIG. 2. The vectors 140 and 142 represent the total weight of the rear portion of the wheel loader 10. Similarly, an upper and a lower horizontal loading vector represented by broken lines 144 and 146, respectively, together represent the counterclockwise moment acting upon the upper and lower hinge joints. These loading vectors may be geometrically added at each joint to provide a resultant rear load represented by solid line 148 acting on the upper hinge joint, and a resultant rear load represented by solid line 150 acting on the lower hinge joint. These rear loads are opposed by equal and opposite reaction forces acting through both hinge joints as shown by an upper reaction force represented by solid line 152 and a lower reaction force represented by solid line 154. These vector diagrams illustrate the load-sharing capability of the similarly-designed upper and lower hinge joints of the present invention.

In view of the foregoing, it is readily apparent that the structure of the present invention provides an improved hinge joint of extremely simple construction which is easy to assemble and disassemble because it has few parts and does not require axially-loaded thrust surfaces which would be required if separate spherical bearings were mounted on connecting pins. Furthermore, in the present system, the upper and lower hinge joints work together to absorb the external and internal forces acting upon the vehicle through an important load sharing action. Still further, the individual components of the joints may be premachined in a convenient manner to eliminate the need for line-boring or controlled machining of such parts subsequent to assembly thereof on the vehicle.

While the invention has been described and shown with particular reference to the preferred embodiments, it will be apparent that variations are possible which would fall within the spirit of the present invention, which is not intended to be limited, except by the scope of the following claims.

What is claimed is:

1. In an articulated vehicle, a hinge joint, for articulatingly connecting first and second frames corresponding to rear and front sections of said vehicle, comprising;

a single arm extending from said first frame having a substantially vertical cylindrical bore defined therein, said bore having a stepped portion, a pair of arms extending from said second frame adapted for disposition above and below said single arm, a pin member having a spherical bearing portion formed integrally with a pair of trunnions extending therefrom, clamping means defining with portions of said pair of arms cylindrical openings for holding said pair of trunnions in substantially vertical position and to dispose said spherical bearing portion between said pair of arms, and spherical bushing means including a pair of inwardly facing separate spherically-socketed bearing shells and disposed within said cylindrical bore in engagement with said stepped portion for receiving said spherical bearing portion to articulatingly connect said first and second frames.

2. The invention of claim 1 including retaining means associated with said single arm for holding said spherical bushing means within said cylindrical bore in close proximity to said spherical bearing portion of said pin member.

3. The invention of claim 2 wherein said retaining means includes a stepped portion in said cylindrical bore and retaining plate means for respectively containing said spherical bushing means therebetween.

4. The invention of claim 1 wherein said clamping means comprises a pair of caps and associated fastener means for removably securing said caps to said pair of arms.

5. The invention of claim 4 wherein said pair of trunnions consist of a pair of cylindrical members having a common radius which is slightly greater than the common radii of said pair of cylindrical openings such that said clamping means and said pair of arms wedgeably grip said trunnions within said openings.

6. The invention of claim 1 wherein said pair of arms integrally extend from a common body which is securable to said second frame by welding.

7. The invention of claim 6 wherein said single arm is a separate element securable to said first frame by welding.

8. The invention of claim 1 wherein said pair of spherically-socketed bearing shells are formed by the resultant parts of a fractured bearing.

9. The invention of claim 1 including seal means mounted within said cylindrical bore and disposed in sealing contact with said pin member for protecting said spherical bearing portion and said spherical bushing means.

10. The invention of claim 9 wherein said seal means include a pair of seal members disposed adjacent to opposite extremities of said spherical bushing means in sealing contact with said spherical bearing portion.

11. The invention of claim 10 including a pair of annular recesses formed in said spherical bushing means adapted to seatably receive said pair of seal members therein.

12. The invention of claim 3 including a counterbore formed in said single arm, a counterbore in said retaining plate means, and seal means seated within said single arm counterbore and said retaining plate means counterbore in sealing contact with said pin member for protecting said spherical bearing portion and said spherical bushing means.

13. In an articulated vehicle, a pair of hinge joints, for articulatingly connecting first and second vehicle frames at upper and lower portions thereof wherein each hinge joint comprises;

a single arm extending from said first frame having a substantially vertical cylindrical bore with a stepped portion therein, a pair of arms extending from said second frame disposed above and below said single arm, a pin member having a spherical bearing portion and a pair of trunnions formed integrally therewith and extending therefrom, clamping means defining with said pair of arms cylindrical openings for directly engaging and holding said pair of trunnions in substantially vertical position so that said spherical bearing portion is disposed between said pair of arms, spherical bushing means including a pair of inwardly facing spherically-socketed bearing shells disposed within said bore upon said stepped portion for receiving said spherical bearing portion, and seal means in contact with said pin member for protecting said spherical bearing portion and said spherical bushing means.

* * * * *